United States Patent
Lee et al.

(10) Patent No.: US 12,531,005 B2
(45) Date of Patent: Jan. 20, 2026

(54) DISPLAY DEVICE, CONTROL METHOD THEREOF, AND IC CHIP

(71) Applicant: SAMSUNG ELECTRONICS CO., LTD., Suwon-si (KR)

(72) Inventors: Jiwon Lee, Suwon-si (KR); Sungyong Joo, Suwon-si (KR); Junhyun Won, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 12 days.

(21) Appl. No.: 18/094,741

(22) Filed: Jan. 9, 2023

(65) Prior Publication Data
US 2023/0162652 A1   May 25, 2023

Related U.S. Application Data

(63) Continuation of application No. PCT/KR2021/007881, filed on Jun. 23, 2021.

(30) Foreign Application Priority Data

Jul. 23, 2020  (KR) .......................... 10-2020-0091554

(51) Int. Cl.
*G09G 3/20* (2006.01)

(52) U.S. Cl.
CPC ..... *G09G 3/2092* (2013.01); *G09G 2330/021* (2013.01); *G09G 2330/04* (2013.01)

(58) Field of Classification Search
CPC ........... G09G 3/2092; G09G 2330/021; G09G 2330/04
See application file for complete search history.

(56) References Cited

U.S. PATENT DOCUMENTS

| | | | | |
|---|---|---|---|---|
| 3,997,813 A | * | 12/1976 | Chan | ................... H01L 29/0847 257/E27.06 |
| 4,970,444 A | * | 11/1990 | Crowley | ................ G09G 1/002 348/689 |
| 7,091,705 B2 | | 8/2006 | Hoshino et al. | |

(Continued)

FOREIGN PATENT DOCUMENTS

| | | |
|---|---|---|
| JP | 3122962 U | 6/2006 |
| JP | 4174999 B2 | 11/2008 |

(Continued)

OTHER PUBLICATIONS

International Search Report (PCT/ISA/210) dated Oct. 1, 2021 issued by the International Searching Authority in International Application No. PCT/KR2021/007881.

(Continued)

*Primary Examiner* — Michael J Jansen, II
(74) *Attorney, Agent, or Firm* — Sughrue Mion, PLLC

(57) ABSTRACT

A display device includes a power generation part including a converter and configured to supply power to a display panel and a main circuit that are in the display device; and an integrated circuit (IC) chip configured to provide a feedback signal to the power generation part based on a voltage outputted from the power generation part being equal to or higher than a first threshold voltage, wherein the power generation part is further configured to stop a switching operation of the converter based on the feedback signal.

14 Claims, 12 Drawing Sheets

(56) References Cited

U.S. PATENT DOCUMENTS

| | | | |
|---|---|---|---|
| 7,358,685 B2 | 4/2008 | Lee | |
| 7,525,780 B2* | 4/2009 | Okamatsu | H05B 41/2853 |
| | | | 315/307 |
| 7,566,845 B2 | 7/2009 | Usui et al. | |
| 8,492,982 B2* | 7/2013 | Hagino | H05B 45/46 |
| | | | 315/192 |
| 8,653,742 B2* | 2/2014 | Kikuchi | H05B 45/10 |
| | | | 315/307 |
| 8,791,679 B2 | 7/2014 | Gagne et al. | |
| 8,890,428 B2* | 11/2014 | Ahn | H05B 47/165 |
| | | | 315/210 |
| 9,177,508 B2* | 11/2015 | Kikuchi | H05B 45/39 |
| 9,182,629 B2* | 11/2015 | Hao | H05B 47/14 |
| 9,949,333 B2* | 4/2018 | Nagao | H05B 47/25 |
| 10,312,708 B2 | 6/2019 | Ono | |
| 10,891,888 B2* | 1/2021 | Wu | G09G 3/3233 |
| 10,923,047 B2* | 2/2021 | Li | G09G 3/36 |
| 11,132,958 B2 | 9/2021 | Lee et al. | |
| 2005/0127883 A1 | 6/2005 | Hoshino et al. | |
| 2006/0261752 A1 | 11/2006 | Lee | |
| 2007/0241694 A1* | 10/2007 | Okamatsu | H05B 41/2853 |
| | | | 315/307 |
| 2011/0018906 A1* | 1/2011 | Chiu | H05B 44/00 |
| | | | 345/77 |
| 2011/0279043 A1* | 11/2011 | Hagino | H05B 45/46 |
| | | | 315/185 R |
| 2012/0044142 A1* | 2/2012 | Wu | G06F 1/3231 |
| | | | 345/158 |
| 2012/0229045 A1* | 9/2012 | Kikuchi | H05B 45/10 |
| | | | 315/224 |
| 2012/0249116 A1 | 10/2012 | Gagne et al. | |
| 2013/0120687 A1* | 5/2013 | Hao | H05B 47/20 |
| | | | 315/122 |
| 2014/0062326 A1* | 3/2014 | Ahn | G09G 3/3406 |
| | | | 315/210 |
| 2014/0168567 A1* | 6/2014 | Kikuchi | H05B 45/38 |
| | | | 349/61 |
| 2016/0261202 A1 | 9/2016 | Kikuchi et al. | |
| 2017/0040820 A1 | 2/2017 | Ono | |
| 2018/0035512 A1* | 2/2018 | Nagao | H05B 45/50 |
| 2019/0228718 A1 | 7/2019 | Lee et al. | |
| 2019/0385540 A1* | 12/2019 | Li | G09G 3/3406 |
| 2020/0090572 A1* | 3/2020 | Wu | G09G 3/20 |
| 2021/0366354 A1 | 11/2021 | Li et al. | |

FOREIGN PATENT DOCUMENTS

| | | |
|---|---|---|
| JP | 2012-190559 A | 10/2012 |
| JP | 2018-19498 A | 2/2018 |
| JP | 6578111 B2 | 9/2019 |
| KR | 10-0123006 B1 | 11/1997 |
| KR | 10-0226697 B1 | 10/1999 |
| KR | 10-0314068 B1 | 11/2001 |
| KR | 10-0385145 B1 | 5/2003 |
| KR | 10-2005-0034553 A | 4/2005 |
| KR | 10-2006-0055057 A | 5/2006 |
| KR | 10-2006-0119018 A | 11/2006 |
| KR | 10-0985505 B1 | 10/2010 |
| KR | 10-1066456 B1 | 9/2011 |
| KR | 10-1615449 B1 | 4/2016 |
| KR | 10-2016-0149233 A | 12/2016 |
| KR | 10-1751315 B1 | 6/2017 |
| KR | 10-1982296 B1 | 5/2019 |
| KR | 10-2019-0090673 A | 8/2019 |
| KR | 10-2020-0070156 A | 6/2020 |

OTHER PUBLICATIONS

Written Opinion (PCT/ISA/237) dated Oct. 1, 2021 issued by the International Searching Authority in International Application No. PCT/KR2021/007881.

Communication dated Aug. 29, 2024, issued by the Korean Patent Office in Korean Application No. 10-2020-0091554.

\* cited by examiner (RELATED ART)

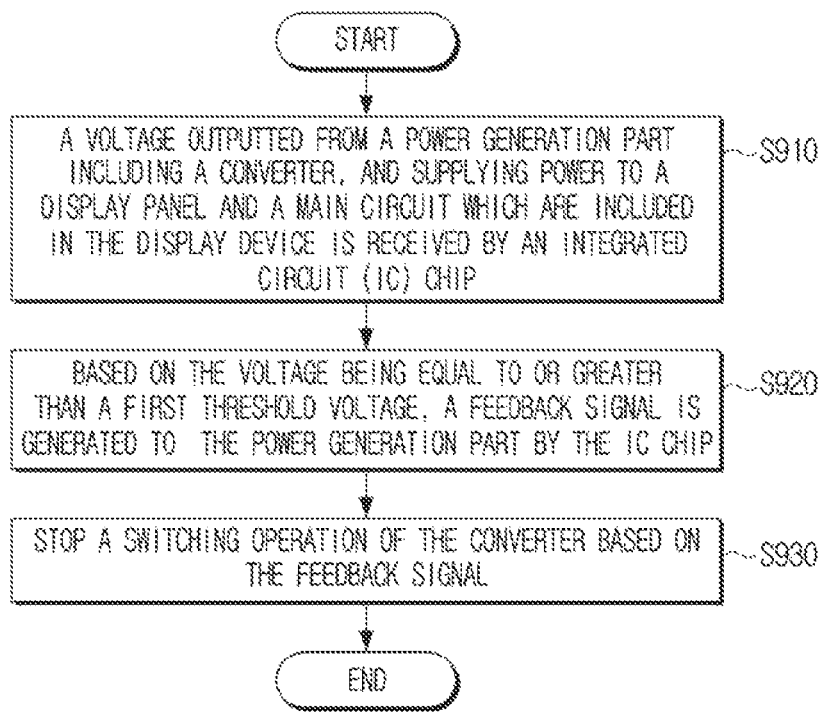

DISPLAY DEVICE, CONTROL METHOD THEREOF, AND IC CHIP

CROSS-REFERENCE TO RELATED APPLICATIONS

This application is a by-pass continuation application of International Application No. PCT/KR2021/007881, filed on Jun. 23, 2021, which based on and claims priority to Korean Patent Application No. 10-2020-0091554, filed on Jul. 23, 2020, in the Korean Intellectual Property Office, the disclosures of which are incorporated by reference herein in their entireties.

BACKGROUND

1. Field

The disclosure relates to a power generation part and an Integrated Circuit (IC) chip of a display device for supplying stable power to adjacent electronic components.

2. Description of Related Art

Each component in a display device needs different powers. Accordingly, a display device includes a power generation part that outputs powers needed by each component in the display device.

The power generation part (a Switched Mode Power Supply, SMPS) is a device that converts an alternating current power into a direct current power by using a switching transistor, etc. Here, the quality of a direct current power output from the power generation part may be greatly influenced by the operations of the components supplied with the power, and the power generation part needs to supply a stable direct current power.

In particular, in the power generation part, a high voltage may be output due to an abnormal operation, and the power generation part may include an Over Voltage Protection (OVP) circuit for protecting the components connected to the power generation part.

FIG. 1A and FIG. 1B are diagrams for illustrating an example of an over voltage protection circuit according to the conventional technology. First, the first circuit 11 in FIG. 1A is an over voltage protection circuit using a 431 regulator, and if the voltage of the node A of 13V rises to 18V, the first circuit 11 provides a feedback signal to a primary AC/DC circuit of the power generation part by using a photo coupler. The power generation part gets to stop a switching operation, and the voltage of the node A becomes 0, and such an operation is illustrated in FIG. 1B.

Also, the power generation part may include a circuit for minimizing power consumption. The second circuit 12 in FIG. 1A is a circuit for reducing standby power consumption of the integrated circuit (IC) chip on the right side. Specifically, if a PS Off signal is input through a PS On/Off terminal, the second circuit 12 may open the node A and the node B, and thereby reduce the standby power consumption of the IC chip.

In addition or alternatively, the power generation part may include a protection circuit according to a fault of a device connected to the power generation part. The IC chip in FIG. 1A identifies a fault of a device connected to the power generation part, and provides a fault signal to a primary AC/DC circuit of the power generation part through the third circuit 13. The power generation part may protect components connected to the power generation part by stopping a switching operation according to the fault signal.

However, in a conventional power generation part, circuits for performing each function are implemented separately, and thus there is a problem that the circuits are complex and the cost for implementation increases.

Also, there is a problem that, if the node A and the node B are opened by the second circuit 12, an overvoltage protecting operation is impossible in the state of a standby mode.

SUMMARY

The disclosure is for addressing the aforementioned need, and the purpose of the disclosure is in providing a display device that is for implementing a power generation part in the display device simply while minimizing power consumption, a method thereof, and an IC chip.

According to an aspect of the disclosure, a display device includes a power generation part that includes a converter and configured to supply power to a display panel and a main circuit in the display device; and an integrated circuit (IC) chip configured to provide a feedback signal to the power generation part based on a voltage outputted from the power generation part being equal to or higher than a first threshold voltage, wherein the power generation part is further configured to stop a switching operation of the converter based on the feedback signal.

The display device is further comprising: a standby circuit that is connected to an output end of the power generation part, and, based on a standby mode instruction being received by the standby circuit, that reduces a voltage value of a voltage outputted from the power generation part.

Based on the voltage value of the voltage becoming lower than a second threshold voltage, the IC chip transmits to a circuit connected to the power generation part, a first control signal for changing a state of the circuit to an idle state, and the second threshold voltage is lower than the first threshold voltage.

The IC chip transmits, based on the voltage value of the voltage outputted from the power generation part becoming higher than a third threshold voltage that is higher than the second threshold voltage while the circuit connected to the power generation part is in the idle state, a second control signal for waking up the circuit connected to the power generation part to the circuit, and the third threshold voltage is lower than the first threshold voltage.

The IC chip transmits, based on an idle enable signal being received while the circuit connected to the power generation part is in the idle state, a second control signal for waking up the circuit connected to the power generation part to the circuit.

The IC chip receives a pulse width modulation (PWM) dimming signal, and based on a period that a low value of the PWM dimming signal is maintained exceeding a threshold time, provides the feedback signal to the power generation part, and transmits to the circuit connected to the power generation part, a first control signal for changing a state of the circuit to an idle state.

The IC chip transmits, based on re-receiving the PWM dimming signal after providing the feedback signal, a second control signal for waking up the circuit connected to the power generation part to the circuit.

The IC chip identifies a fault of a circuit supplied with a voltage from the power generation part, and based on the circuit malfunctioning, provides the feedback signal to the power generation part.

The IC chip comprises: a comparator comparing a voltage outputted from the power generation part and the first threshold voltage; and a transistor outputting the feedback signal to the power generation part based on an output value of the comparator.

According to another aspect of the embodiment, a method of a display device includes the following steps: receiving, by an integrated circuit (IC) chip, a voltage outputted from a power generation part including a converter and supplying power to a display panel and a main circuit in the display device; and based on the voltage being equal to or higher than a first threshold voltage, providing a feedback signal to the power generation part by the IC chip; and stopping a switching operation of the converter based on the feedback signal.

The method is further comprising, based on a standby mode instruction, reducing a voltage value of a voltage outputted from the power generation part.

The method is further comprising: based on the voltage value of the voltage outputted from the power generation part becoming lower than a second threshold voltage, transmitting to the circuit connected to the power generation part, a first control signal for changing a state of the circuit to an idle state, wherein the second threshold voltage is lower than the first threshold voltage.

The method is further comprising: based on the voltage value of the voltage outputted from the power generation part becoming higher than a third threshold voltage higher than the second threshold voltage while the circuit connected to the power generation part is in the idle state, transmitting a second control signal for waking up the circuit connected to the power generation part to the circuit by the IC chip, wherein the third threshold voltage is lower than the first threshold voltage.

The method is further comprising: based on an idle enable signal being received while the circuit connected to the power generation part is in the idle state, transmitting a second control signal for waking up the circuit connected to the power generation part to the circuit by the IC chip.

The method is further comprising: receiving a pulse width modulation (PWM) dimming signal by the IC chip; and based on a period that a low value of the PWM dimming signal is maintained exceeding a threshold time, providing the feedback signal to the power generation part by the IC chip, and transmitting to the circuit connected to the power generation part, a first control signal for changing a state of the circuit to an idle state.

The method is further comprising: transmitting by the IC chip, based on re-receiving the PWM dimming signal after providing the feedback signal, a second control signal for waking up the circuit connected to the power generation part to the circuit.

The method is further comprising: identifying, by the IC chip, a fault of a circuit supplied with a voltage from the power generation part, and wherein the providing comprises, based on the circuit malfunctioning, providing the feedback signal to the power generation part.

The IC chip comprises: a comparator comparing a voltage outputted from the power generation part and the first threshold voltage; and a transistor outputting the feedback signal to the power generation part based on an output value of the comparator.

According to the various embodiments of the disclosure as described above, in a display device, an IC chip identifies an overvoltage outputted from a power generation unit and provides a feedback signal, and accordingly, the same operation can be performed without a conventional overvoltage protection circuit.

Also, if a PS Off signal is input, the display device reduces a voltage of a direct current power provided by the power generation unit of the display device, and can thereby reduce standby power consumption consumed by the IC chip. Also, when the voltage of the direct current power is reduced, the IC chip changes components connected to the IC chip to an idle state, and can thereby also reduce standby power consumption consumed by the components connected to the IC chip.

Further, as the IC chip can always detect a direct current power, there is a benefit that an overvoltage protecting operation is not stopped. In addition, as a circuit inverting a signal is omitted among protection circuits according to a fault at the power generation unit, the cost for implementation can be reduced, and the display device can be implemented in a smaller size.

Also, as the existing terminal of the IC chip can be used as it is, the manufacturing cost of the IC chip does not increase even through the functions of the IC chip are added.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9 illustrates a method of a display device according to an embodiment of the disclosure.

DETAILED DESCRIPTION

Hereinafter, the disclosure will be described in detail with reference to the accompanying drawings. As terms used in the embodiments of the disclosure, general terms that are currently used widely were selected as far as possible, in consideration of the functions described in the disclosure. However, the terms may vary depending on the intention of those skilled in the art, previous court decisions, or emergence of new technologies. Also, in particular cases, there may be terms that were arbitrarily designated by the applicant, and in such cases, the meaning of the terms will be described in detail in the relevant descriptions in the disclosure. Thus, the terms used in the disclosure should be defined based on the meaning of the terms and the overall content of the disclosure, but not just based on the names of the terms.

Also, in this specification, expressions such as "have," "may have," "include," and "may include" denote the existence of such characteristics (e.g., elements such as numbers, functions, operations, and components), and do not exclude the existence of additional characteristics. In addition, the expression "at least one of A and/or B" should be interpreted to mean any one of "A" or "B" or "A and B." Further, the expressions "first," "second," and the like used in this specification may be used to describe various elements regardless of any order and/or degree of importance. Also, such expressions are used only to distinguish one element from another element, and are not intended to limit the elements.

Singular expressions include plural expressions, as long as they do not obviously mean differently in the context. In addition, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Also, in this specification, the term "user" may refer to a person who uses an electronic device or a device using an electronic device (e.g., an artificial intelligence electronic device). Hereinafter, various embodiments of the disclosure will be described in more detail with reference to the accompanying drawings.

Figure 2:
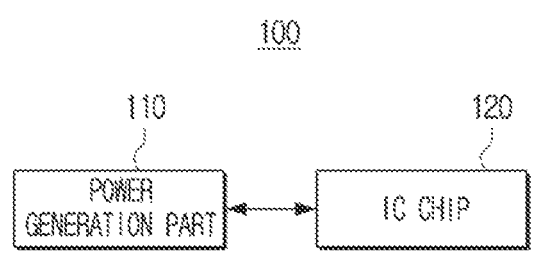
FIG. 2 illustrates a display device according to an embodiment of the disclosure.

FIG. 2 is a block diagram for illustrating a display device 100 according to an embodiment of the disclosure. As illustrated in FIG. 2, the display device 100 includes a power generation part 110 and an integrated circuit (IC) chip 120. However, the disclosure is not limited thereto, and the display device 100 may be implemented in a form wherein some components are excluded, and may also be implemented in a form wherein other components are further included.

The display device 100 may be a device that includes a display panel such as a TV, a desktop PC, a laptop computer, a video wall, a large format display (LFD), digital signage, a digital information display (DID), a projector display, a digital video disk (DVD) player, a smartphone, a tablet PC, a monitor, smart glasses, a smart watch, etc., and directly displays information corresponding to a received signal.

The power generation part 110 may include a converter that outputs a direct current power through a switching operation. The power generation part 110 may output direct current powers with various voltages, and supply the powers with a plurality of components. For example, the power generation part 110 may output direct current powers with various voltages, and supply the powers to a display panel, a main circuit, etc. included in the display device 100.

If a feedback signal is received from an IC chip 120, the power generation part 110 may stop the switching operation of the converter. In this case, the power generation part 110 may not output a direct current power anymore.

The IC chip 120 may monitor a voltage outputted from the power generation part 110. For example, if a voltage outputted from the power generation part 110 is equal to or higher than a first threshold voltage, the IC chip 120 may provide a feedback signal to the power generation part 110. That is, if it is identified that an abnormality occurred in a voltage outputted from the power generation part 110 and there is a possibility that a circuit may be damaged, the IC chip 120 may provide a feedback signal to the power generation part 110, and the power generation part 110 may stop the switching operation of the converter based on the feedback signal.

Alternatively, the IC chip 120 may receive a PWM dimming signal, and if the time that a low value of the PWM dimming signal is maintained exceeds a threshold time, the IC chip 120 may provide a feedback signal to the power generation part 110. That is, if the time that the low value of the PWM dimming signal is maintained exceeds the threshold time, the IC chip 120 may identify that the display panel 130 does not output an image signal, and provide a feedback signal to the power generation part 110. Here, a PWM dimming signal may be provided from the display panel 130 or the main circuit depending on implementation examples.

After providing a feedback signal to the power generation part 110, the IC chip 120 may transmit to a circuit connected to the power generation part 110, a control signal for changing a state of the circuit to an idle state. Afterwards, when the PWM dimming signal is re-received, the IC chip 120 may transmit a control signal for waking up the circuit connected to the power generation part 110 to the circuit.

Alternatively, the IC chip 120 may identify a fault of a circuit supplied with power from the power generation part 110, and in case the circuit malfunctions, the IC chip 120 may provide a feedback signal to the power generation part 110. For example, the IC chip 120 may detect a voltage of a predetermined node of the main circuit 140, and if an abnormality occurs in the voltage of the predetermined node, the IC chip 120 may identify that the main circuit 140 malfunctions, and provide a feedback signal to the power generation part 110.

The display device 100 may further include a standby circuit 420 (illustrated in FIG. 4A) that is connected to an output end of the power generation part 110. If the standby circuit 420 receives a standby mode instruction, the standby circuit 420 reduces a voltage value of a voltage outputted from the power generation part 110.

For example, if the display device 100 is a TV, a standby mode instruction may be a turn-off instruction for the TV. In this case, the standby mode instruction may be input through a button provided on the TV, but it may also be received from a remote control device. In the case of the latter, the TV may include a communication interface, and receive a turn-off instruction from the remote control device through the communication interface.

The communication interface is a component for performing communication with various devices, and it may be implemented by various wireless communication methods such as BlueTooth (BT), Bluetooth Low Energy (BLE), Wireless Fidelity (WI-FI), Zigbee, etc. However, the communication interface is not limited thereto, and it can be any device if it is of a communication standard that can communicate with an external device.

If the voltage value of the voltage outputted from the power generation part 110 becomes lower than a second threshold voltage, the IC chip 120 may transmit a control signal for changing the circuit connected to the power generation part 110 to the idle state to the circuit.

Also, if the voltage value of the voltage outputted from the power generation part 110 becomes higher than a third threshold voltage higher than the second threshold voltage while the circuit connected to the power generation part 110 is in the idle state, the IC chip 120 may transmit a control signal for waking up the circuit connected to the power generation part 110 to the circuit. Here, the third threshold voltage may be lower than the first threshold voltage.

Alternatively, if an idle enable signal is received while the circuit connected to the power generation part 110 is in the idle state, the IC chip 120 may transmit a control signal for waking up the circuit connected to the power generation part 110 to the circuit. In this case, the voltage value of the voltage outputted from the power generation part 110 is still in a state of having become lower, but the circuit connected to the power generation part 110 may be woken up.

The IC chip 120 may include a comparator comparing a voltage outputted from the power generation part 110 and the first threshold voltage, and a transistor outputting a feedback signal to the power generation part 110 based on an output value of the comparator.

As described above, in the display device 100, the IC chip identifies an overvoltage outputted from the power generation part 110 and provides a feedback signal, and accordingly, the same operation can be performed without a conventional overvoltage protection circuit. Also, if a standby mode instruction (a PS Off signal) is input, the display device 100 may reduce a voltage of a direct current power supplied by the power generation part 110 and changes the ambient components to an idle state, and can thereby reduce standby power consumption consumed by the IC chip and standby power consumption consumed by the ambient components. In addition, as a circuit inverting a signal is omitted among protection circuits according to a fault at the power generation part 110, the cost for implementation can be reduced.

Figure 3:
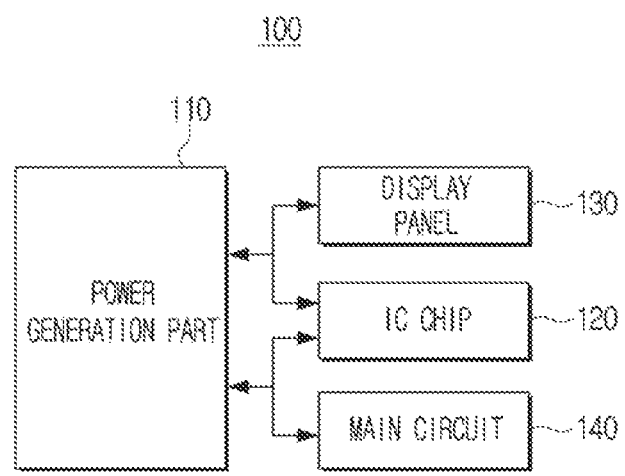
FIG. 3 illustrates a detailed configuration of a display device according to an embodiment of the disclosure.

FIG. 3 is a block diagram illustrating a detailed configuration of the display device 100 according to an embodiment of the disclosure. As illustrated in FIG. 3, the display device 100 not only comprises the power generation part 110 and the IC chip 120, but also further comprises the display panel 130 and the main circuit 140. Among the components in FIG. 3, regarding components overlapping with FIG. 2, explanation will be omitted. The display panel 130 and the main circuit 140 in FIG. 3 are examples of the circuit connected to the power generation part 110.

The display panel 130 comprises a plurality of pixels, and may display an image signal. Also, the display panel 130 may further comprise a backlight unit, a backlight driving part, and a panel driving part.

The backlight driving part may be implemented in a form of including a driver IC for driving the backlight unit through a pulse width modulation (PWM) dimming signal. According to an embodiment, the driver IC may be implemented as separate hardware from the main circuit 140. For example, in case light sources comprised in the backlight unit are implemented as LED elements, the driver IC may be implemented as at least one LED driver controlling currents applied to the LED elements. According to an embodiment, the LED driver may be arranged on the rear end of the power generation part 110, and receive a voltage from the power generation part 110. According to another embodiment, the LED driver may receive a voltage from a separate power device. Alternatively, it is also possible that the power generation part 110 and the LED driver are implemented in a form of one integrated module.

The panel driving part may be implemented in a form of including the driver IC for driving the display panel 130. According to an embodiment, the driver IC may be implemented as separate hardware from the main circuit 140. For example, the panel driving part may comprise a data driving part providing video data to data lines, and a gate driving part providing scan pulses to gate lines.

The main circuit 140 may control each component of the display device 100. For example, the main circuit 140 comprises a processor, and may control the overall operations of the display device 100 through the processor.

The power generation part 110 may supply different powers to the display panel 130 and the main circuit 140. The IC chip 120 may identify whether a problem occurs in voltages provided to the display panel 130 and the main circuit 140, and provide a feedback signal to the power generation part 110.

Hereinafter, the circuit configuration and the operations of the display device 100 will be described in detail with reference to the drawings.

Figure 4A:
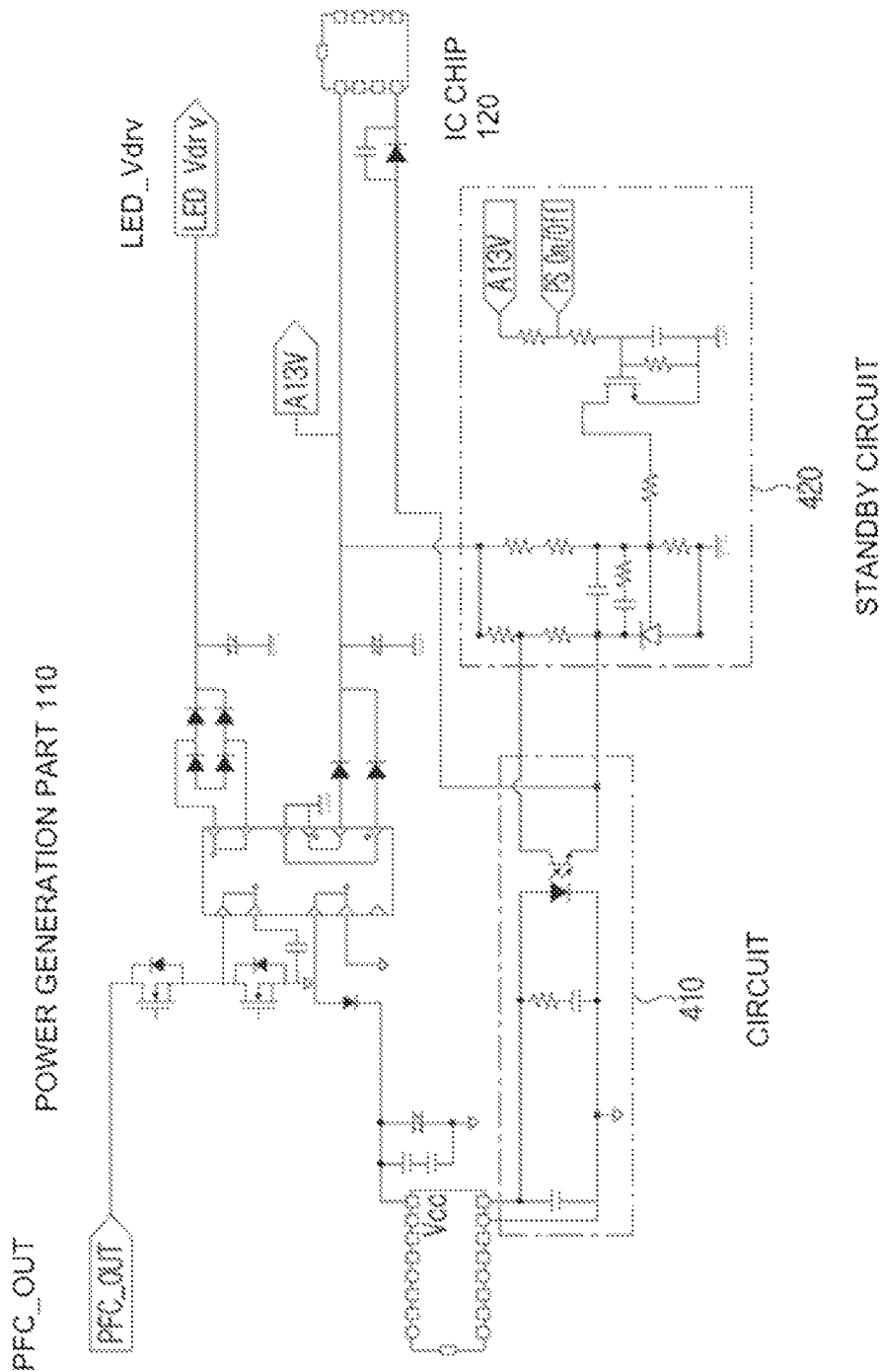
FIG. 4A and FIG. 4B illustrate in more detail a circuit configuration of a display device according to an embodiment of the disclosure.
Figure 4B:
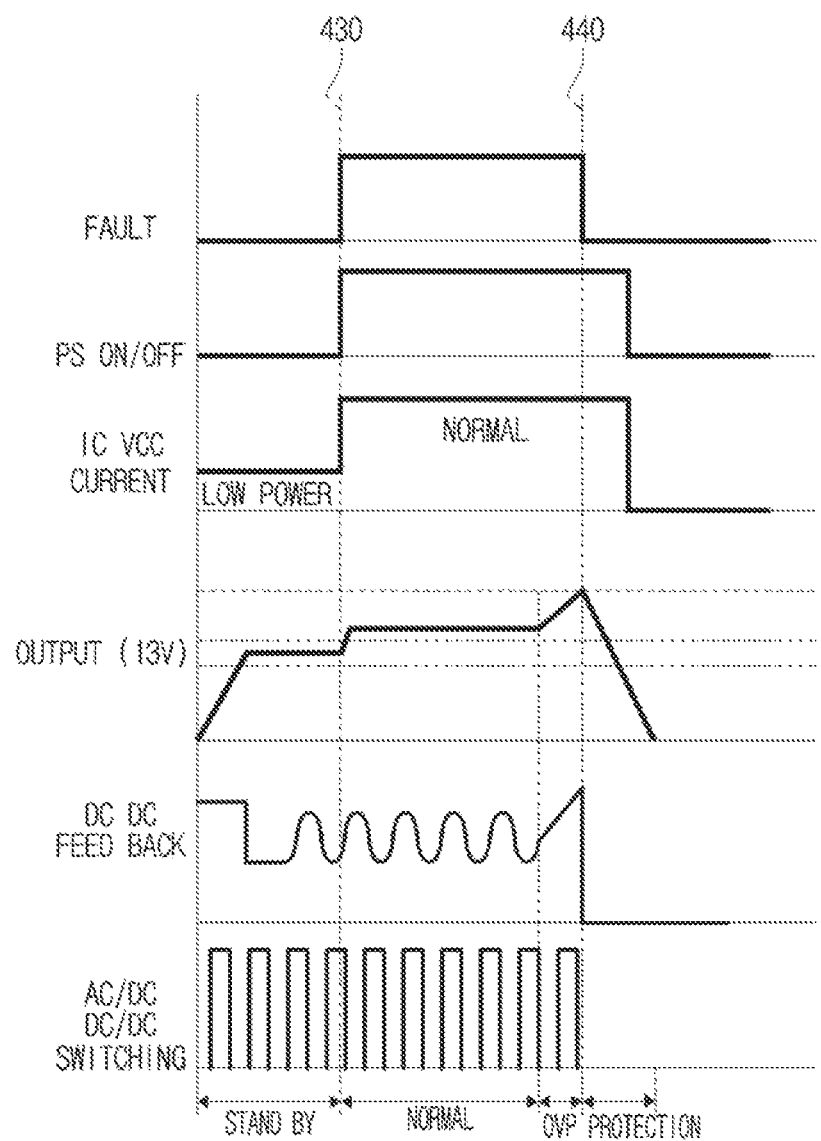

FIG. 4A and FIG. 4B are diagrams for illustrating in more detail a circuit configuration of the display device 100 according to an embodiment of the disclosure. In particular, in FIG. 4A and FIG. 4B, the configurations for the power generation part 110 and the IC chip 120 of the display device 100 were illustrated in detail, for the convenience of explanation.

Figure 1A:
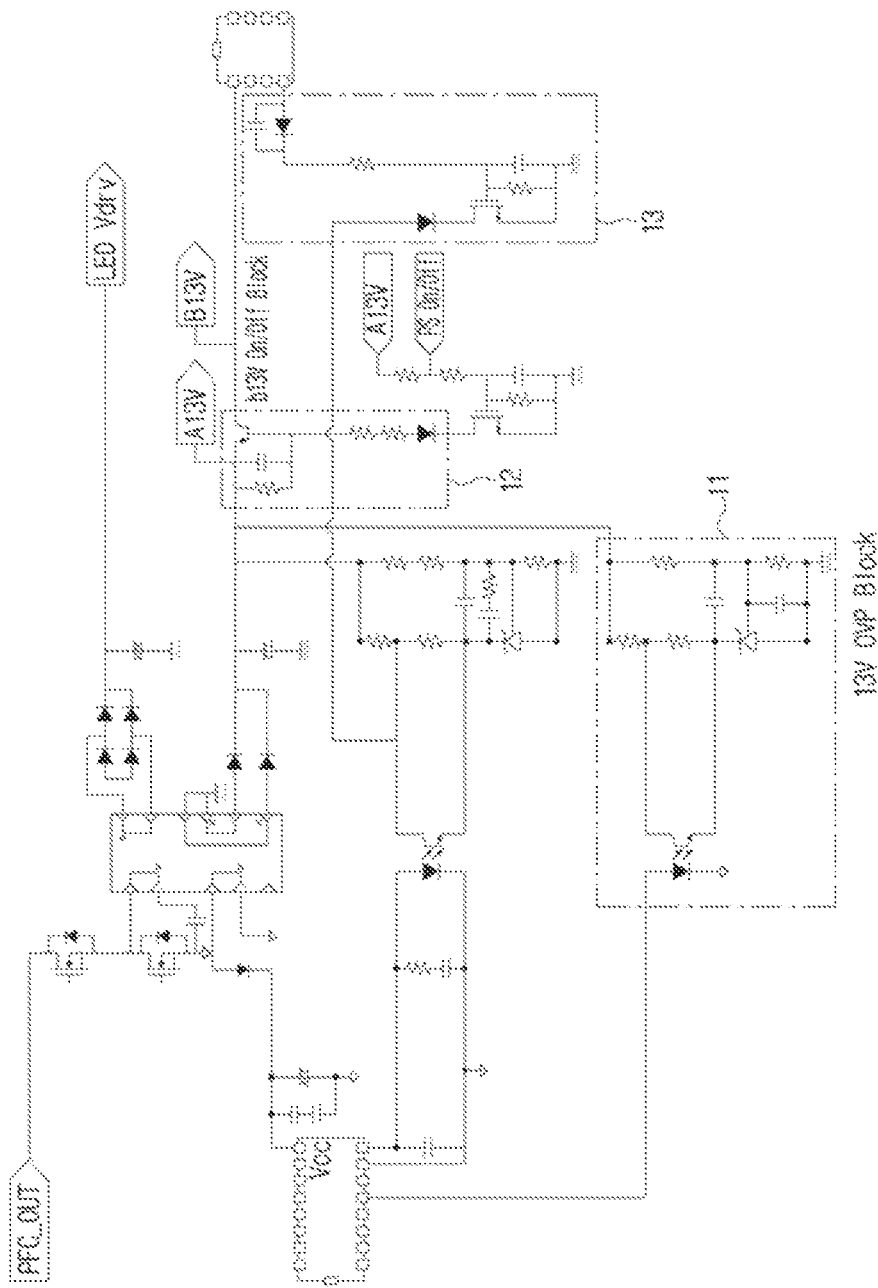
FIG. 1A and FIG. 1B illustrate an embodiment of an overvoltage protecting circuit according to the conventional technology.
Figure 1B:
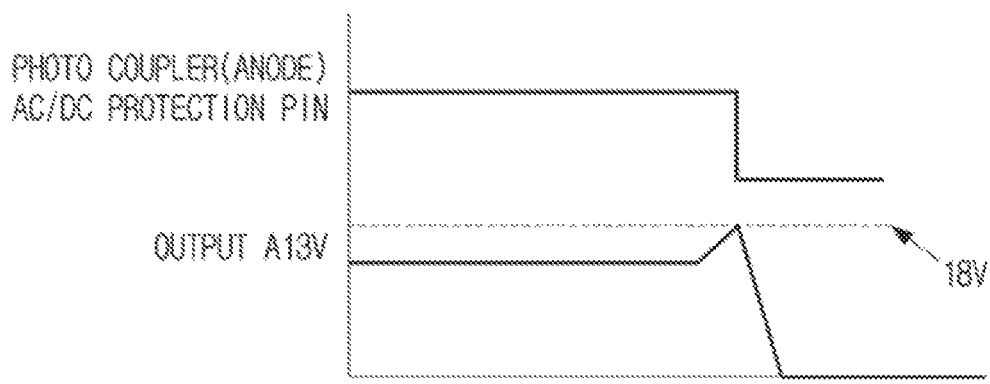

First, as illustrated in FIG. 4A, in the display device 100 according to an embodiment of the disclosure, the first circuit 11, the second circuit 12, and the third circuit 13 in the previous FIG. 1A may be omitted. In FIG. 4A, PFC_OUT refers to an output of a power factor correction (PFC) circuit that is well known in the art. PFC_OUT would typically be connected to the output of the PFC circuit and to the input of a main power supply circuit (e.g., the power generation part 110). The PFC circuit would regulate the voltage and current at the PFC_OUT to ensure that the main power supply circuit receives a clean and efficient power source. The IC chip on the left (including the terminal labeled as 'Vcc') is a part of the power generation part 110. An output of the power generation part 110 is provided to a terminal called as 'LED Vdriv,' which receives a voltage to drive an LED.

First, the operation of the first circuit 11 in the previous FIG. 1A is performed by the IC chip 120 on the right side. The IC chip 120 is connected to the node A through the first terminal on the left side, and if a voltage outputted from the power generation part 110 is equal to or higher than a first threshold voltage, the IC chip 120 may provide a feedback signal to the power generation part 110 through the circuit 410. For example, in case the power generation part 110 operations normally, the voltage of the node A is about 13V, but if a problem occurs in the operation of the power generation part 110 and the voltage of the node A exceeds 18V, the IC chip 120 may provide a feedback signal to the power generation part 110. Specifically, if the voltage of the node A exceeds 18V, the fourth terminal on the left side of the IC chip 120 is changed from a high value (ex: 3V) to a low value (ex: 0V), and on the secondary side of the photo coupler connected to the fourth terminal on the left side of the IC chip 120, a current gets to flow. Accordingly, a current also flows on the primary side of the photo coupler, and the terminal voltage of the IC comprised in the power generation part 110 becomes lower (ex: 0.6V or lower). Through such a method, the feedback signal is transmitted to the power generation part 110, and the power generation part 110 may stop supply of power by stopping the switching operation (ex: switching of AC/DC, DC/DC) of the converter based on the feedback signal. Through such an operation, the circuit can be protected from an overvoltage even if the first circuit 11 in the previous FIG. 1A does not exist.

Also, in the display device 100 according to the disclosure, the second circuit 12 in the previous FIG. 1A is omitted, and thus the IC chip 120 may detect the output of the power generation part 110. For example, according to the previous FIG. 1A, if a standby mode instruction is input, the node A and the node B are opened by the second circuit 12. That is, in case the display device 100 according to the disclosure comprises the second circuit 12 in the previous FIG. 1A, the IC chip 120 cannot detect an overvoltage while in a standby mode. Accordingly, as the IC chip 120 may detect the output of the power generation part 110 according to the disclosure, an overvoltage can be detected even in case the IC chip 120 is in the standby mode.

The second circuit 12 in the previous FIG. 1A performs a role of reducing the standby power consumption of the IC chip 120 in the standby model. In the disclosure, the standby power consumption of the IC chip 120 can be reduced through the standby circuit 420. Specifically, if a standby mode instruction (a PS Off signal) is input through the PS On/Off terminal of the standby circuit 420, the transistor becomes conductive, and the drain voltage of the transistor becomes 0V. That is, the resistance of which one end is connected to the drain of the transistor gets in a parallel resistance state with the resistance connected to the other end, and its resistance value becomes lower, and when the voltage of the 431 regulator becomes lower due to this, the voltage of the node A also becomes lower. Accordingly, the standby power consumed at the IC chip 120 also decreases.

Lastly, the third circuit 13 in the previous FIG. 1A inverted the voltage level of the fourth terminal on the left side of the IC chip 120 and provided the voltage to the secondary upper side of the photo coupler. However, in the disclosure, the voltage level of the fourth terminal on the left side of the IC chip 120 is provided to the secondary lower side of the photo coupler even if the third circuit 13 in the previous FIG. 1A does not exist, and accordingly, the same operation is possible.

As described above, the display device 100 according to the disclosure can perform the same function as in the conventional technology without the first circuit 11, the second circuit 12, and the third circuit 13 in the previous FIG. 1A.

FIG. 4B illustrates values of each signal for each operation state of the display device 100. First, the time before the 430 time point in FIG. 4B is a state wherein the display device 100 operates in the standby mode, and the time from the 430 time point to the 440 time point is a state wherein an overvoltage occurs while the display device is normally operating, and the time after the 440 time point is a state wherein the overvoltage becomes equal to or higher than the first threshold voltage, and a protecting operation proceeds.

In the standby mode in the time before the 430 time point, the IC Vcc current is lower than the case wherein the display device 100 is in a normal state. This indicates that the standby power consumption is reduced in the standby mode.

The Fault indicates the fourth terminal on the left side of the IC chip 120, and it has a high value when the display device 100 normally operates. Here, if the output of the power generation part 110 rises and becomes equal to or higher than the first threshold voltage, the Fault is changed to a low value, and a feedback signal is provided to the power generation part 110.

As the Fault is changed to a low value, the DC Feedback is changed to a low value, and accordingly, the AC/DC and DC/DC switching stops, and due to this, the output also becomes lower from the first threshold voltage.

As the output becomes lower, a low value is also input to the PS On/Off, and the IC Vcc current also becomes 0.

In FIG. 4B, it was illustrated that the supply of power of the power generation part 110 stops, but the disclosure is not limited thereto. For example, after the IC chip 120 provides a feedback signal to the power generation part 110, if the voltage outputted from the power generation part 110 becomes lower than the first threshold voltage, the output of the fourth terminal on the left side of the IC chip 120 may be output as a high value from a low value. In this case, the power generation part 110 may resume the switching operation of the converter, and supply power. Such an operation may be advantageous in protecting the device during a temporary time period in case the overvoltage problem is temporary.

In case the overvoltage problem is not temporary, it may be advantageous to stop the supply of power of the power generation part 110 as in FIG. 4B. Alternatively, if an overvoltage problem occurs again within a threshold time after the IC chip 120 resumed the supply of power of the power generation part 110, the supply of power may be stopped, and may not be resumed automatically.

In FIG. 4A and FIG. 4B, explanation was made focused on a case wherein an overvoltage occurred, but the IC chip 120 may perform a similar operation under more various conditions.

First, the IC chip 120 may identify a fault of a circuit supplied with power from the power generation part 110, and in case the circuit malfunctions, the IC chip 120 may provide a feedback signal to the power generation part 110. For example, the IC chip 120 may identify a fault of the display panel 130 or the main circuit 140, and in case the circuit malfunctions, the IC chip 120 may provide a feedback signal to the power generation part 110. Here, the method of providing a feedback signal is identical to the method described in FIG. 4A.

Also, the IC chip 120 may receive a PWM dimming signal, and if the time that the low value of the PWM dimming signal is maintained exceeds a threshold time, the IC chip 120 may provide a feedback signal to the power generation part 110. In this case, the method of providing a feedback signal is also identical to the method described in FIG. 4A. Then, when the PWM dimming signal is re-received, the IC chip 120 may output the output of the fourth terminal on the left side of the IC chip 120 as a high value from a low value. In this case, the power generation part 110 may resume the switching operation of the converter, and supply power.

If the voltage value of the voltage outputted from the power generation part 110 by the standby circuit 420 becomes lower than the second threshold voltage, the IC chip 120 may transmit to the circuit connected to the power generation part 110 a control signal for changing a state of the circuit to an idle state. Here, the second threshold voltage may be lower than the first threshold voltage. Through such an operation, the standby power consumed not only at the IC chip 120, but also at the other components can be reduced.

Also, if the voltage value of the voltage outputted from the power generation part 110 becomes higher than a third threshold voltage higher than the second threshold voltage while the circuit connected to the power generation part 110 is in the idle state, the IC chip 120 may transmit a control signal for waking up the circuit connected to the power generation part 110 to the circuit. Here, the third threshold voltage may be lower than the first threshold voltage.

Alternatively, if an idle enable signal is received while the circuit connected to the power generation part 110 is in the idle state, the IC chip 120 may transmit a control signal for waking up the circuit connected to the power generation part 110 to the circuit.

Such an operation is based on the premise that the device operates in a standby mode, but the disclosure is not limited thereto, and the IC chip 120 may change the circuit connected to the power generation part 110 to the idle state based on a PWM dimming signal.

For example, if the time that the low value of the PWM dimming signal is maintained exceeds the threshold time, the IC chip 120 may provide a feedback signal to the power generation part 110, and transmit the circuit connected to the power generation part 110, a control signal for changing a state of the circuit to an idle state. Afterwards, when the PWM dimming signal is re-received, the IC chip 120 may transmit to the circuit, a control signal for waking up the circuit.

Figure 5:
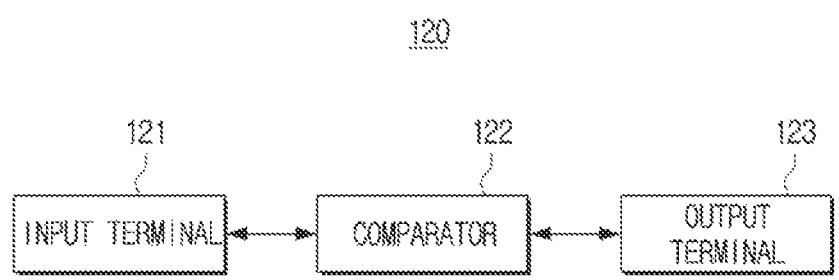
FIG. 5 illustrates an IC chip according to an embodiment of the disclosure.

FIG. 5 is a block diagram for illustrating the IC chip 120 according to an embodiment of the disclosure. As illustrated in FIG. 5, the IC chip 120 comprises an input terminal 121, a comparator 122, and an output terminal 123. However, the disclosure is not limited thereto, and the IC chip 120 may be implemented in a form wherein some components are excluded, or implemented in a form wherein other components are further comprised.

The input terminal 121 may be connected to one of output terminals of the power generation part 110, and may be supplied with power from the power generation part 110. For example, the input terminal 121 may be connected to the output terminal of the power generation part 110 supplying power to the main circuit 140.

The comparator 122 may compare the voltage of the input terminal 121 and the first threshold voltage. Here, the voltage of the input terminal 121 may be the voltage of the output terminal of the power generation part 110.

The output terminal 123 may provide a feedback signal to the power generation part 110 based on the comparison result of the comparator 122. For example, the output terminal 123 may have a high value or a low value according to the comparison result of the comparator 122, and may output a feedback signal by a method that the value is changed.

Figure 6A:
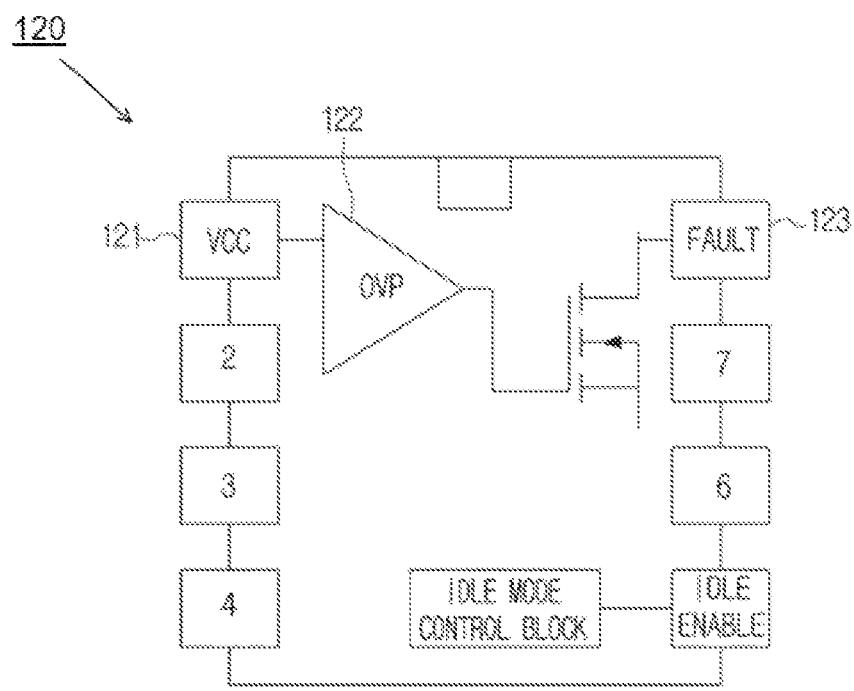
FIG. 6A and FIG. 6B illustrate an internal configuration of an IC chip according to one or more embodiments of the disclosure.
Figure 6B:
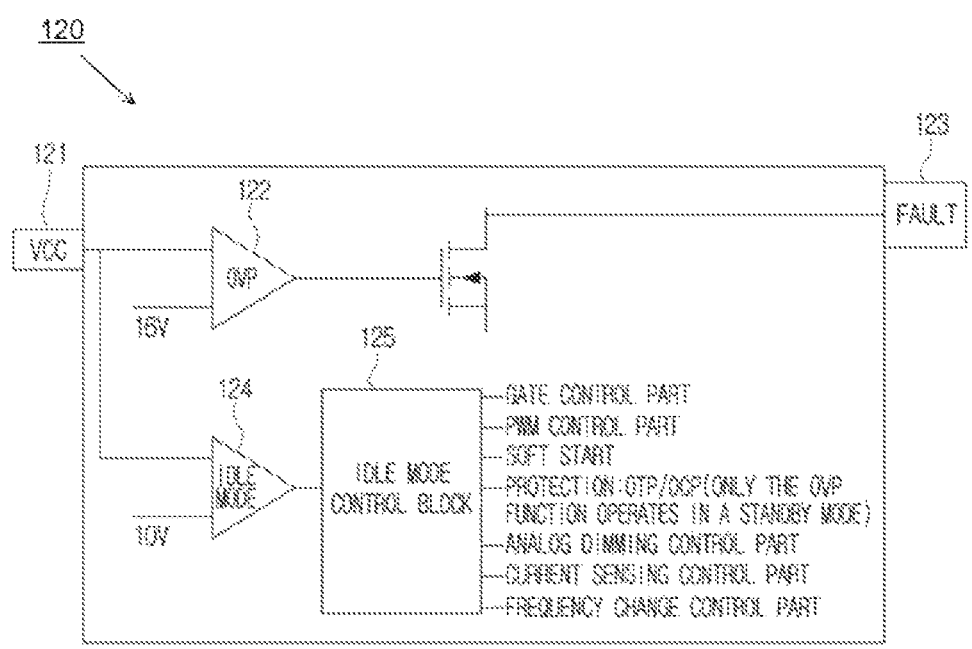

FIG. 6A and FIG. 6B are diagrams for illustrating an internal configuration of the IC chip 120 according to various embodiments of the disclosure.

As illustrated in FIG. 6A, the comparator 122 may be connected to the input terminal 121, and receive input of the voltage level of the input terminal 121, and compare the voltage with the first threshold voltage. The comparator 122 may output the comparison result as a high value or a low value.

The output of the comparator 122 is provided to the gate of the transistor, and if the output of the comparator 122 is a high value, the transistor is turned on, and the output terminal 123 gets to have a low value, and if the output of the comparator 122 is a low value, the transistor is turned off, and the output terminal 123 gets to have a high value.

In addition or alternatively, the comparator 122 may further comprise an idle enable terminal. The comparator 122 may receive a PS On/Off signal or a Blu On/Off signal through the idle enable terminal, and the idle mode control block may control whether the ambient components will perform an idle operation based on the received signal. Here, the PS On/Off signal is a signal for controlling the operation mode provided from the main circuit 140, and the Blu On/Off signal is a signal for controlling whether to drive the backlight unit.

Alternatively, as illustrated in FIG. 6B, the comparator 122 may also be implemented in a form of including an idle mode comparator 124. For example, the idle mode comparator 124 may be connected to the input terminal 121, and receive input of the voltage level of the input terminal 121, and compare the voltage with the second threshold voltage. The idle mode comparator 124 may output the comparison result as a high value or a low value.

The output of the idle mode comparator 124 may be provided to the idle mode control block 125, and the idle mode control block 125 may control whether the ambient components will perform an idle operation. For example, the idle mode control block 125 may control whether the gate control part, the PWM control part, the Soft start, the overvoltage protection part, the analog dimming control part, the current detection control part, the frequency change control part, etc. will perform an idle operation. For example, the idle mode control block 125 will turn off the operations of the ambient components excluding the overvoltage protecting function based on the comparison result of the idle mode comparator 124. The disclosure is not limited thereto, and any component that consumes standby power can be a subject for control of the idle mode control block 125.

Figure 7:
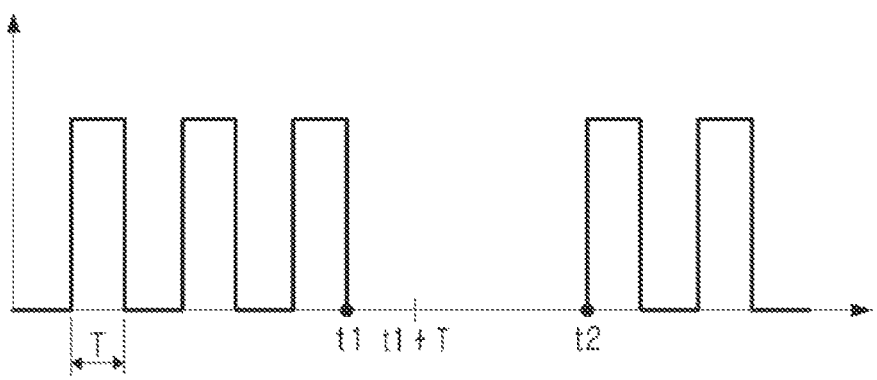
FIG. 7 illustrates an operation of an IC chip based on a Pulse Width Modulation (PWM) dimming signal according to an embodiment of the disclosure.

In the above, it was described that FIG. 6A and FIG. 6B are separate embodiments, but the two methods may be implemented as one IC chip 120. FIG. 7 is a diagram for illustrating an operation of the IC chip 120 based on a PWM dimming signal according to an embodiment of the disclosure.

The display panel 130 may control the backlight unit based on a PWM dimming signal. Here, the IC chip 120 may identify the operation state of the display panel 130 by detecting a PWM dimming signal of the display panel 130.

For example, the display panel 130 may control the backlight unit based on a PWM dimming signal of the period T, as illustrated in FIG. 7. The IC chip 120 may detect the PWM dimming signal of the display panel 130.

Then, after the IC chip 120 identifies a low value from the time point of t1, if the low value is not changed to a high value until the time point of t1+T, the IC chip 120 may provide a feedback signal to the power generation part 110 and transmit to the circuit the power generation part 110, a control signal for changing a state of the circuit to an idle state.

Afterwards, when the low value is changed to a high value at the time point of t2, the IC chip 120 may transmit a control signal for waking up the circuit connected to the power generation part 110 to the circuit.

Figure 8:
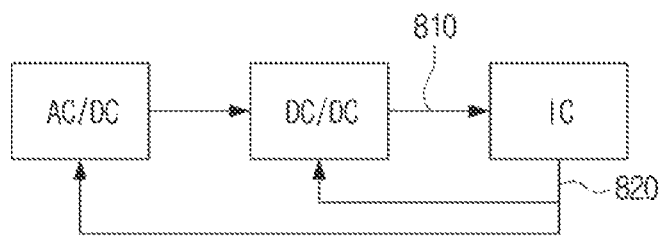
FIG. 8 illustrates an overvoltage protecting operation according to an embodiment of the disclosure.

FIG. 8 is a diagram for illustrating an overvoltage protecting operation according to an embodiment of the disclosure.

As illustrated in FIG. 8, the display device 100 may comprise a component for converting an AC power to a DC power (AC/DC), a component for removing ripples, etc. of a DC power and converting the power to be closer to a direct current power (DC/DC), and the IC chip 120 for detecting an overvoltage and protecting a circuit.

In operation 810 of FIG. 8, the IC chip 120 may detect that an output of DC/DC is changed, and identify whether to change to the standby mode, or to perform an overvoltage protecting operation.

If it is identified that an overvoltage protecting operation should be performed, in operation 820 of FIG. 8, the IC chip 120 may control the switching operations of the AC/DC and the DC/DC, and perform a protecting operation.

FIG. 9 is a flow chart for illustrating a method of a display device according to an embodiment of the disclosure.

First, a voltage outputted from the power generation part 110 including a converter and supplying power to a display panel and a main circuit that are comprised in the display device is received by the integrated circuit (IC) chip 120 in operation S910. Then, if the voltage is equal to or higher than a first threshold voltage, a feedback signal is provided to the power generation part 110 by the IC chip in operation S920. Then, a switching operation of the converter is stopped based on the feedback signal in operation S930.

Also, the method may further comprise a step of, based on a standby mode instruction, reducing a voltage value of a voltage outputted from the power generation part 110.

In addition, the method may further comprise a step of, based on the voltage value of the voltage outputted from the power generation part 110 becoming lower than a second threshold voltage, transmitting to the circuit connected to the power generation part 110, a control signal for changing a state of the circuit to an idle state. Here, the second threshold voltage may be lower than the first threshold voltage.

Further, the method may further comprise a step of, based on the voltage value of the voltage outputted from the power generation part 110 becoming higher than a third threshold voltage higher than the second threshold voltage while the circuit connected to the power generation part 110 is in the idle state, transmitting a control signal for waking up the circuit connected to the power generation part 110 to the circuit by the IC chip 120. Here, the third threshold voltage may be lower than the first threshold voltage.

Alternatively, the method may further comprise a step of, based on an idle enable signal being received while the circuit connected to the power generation part 110 is in the idle state, transmitting a control signal for waking up the circuit connected to the power generation part 120 to the circuit by the IC chip.

The method may further comprise a steps of receiving a pulse width modulation (PWM) dimming signal by the IC chip, and based on a period that a low value of the PWM dimming signal is maintained exceeding a threshold time, providing the feedback signal to the power generation part 120 by the IC chip, and transmitting to the circuit connected to the power generation part 120, a control signal for changing a state of the circuit to an idle state.

Here, the method may further comprise a step of, based on re-receiving the PWM dimming signal after providing the feedback signal, transmitting a control signal for waking up the circuit connected to the power generation part 120 to the circuit by the IC chip.

In the step of identifying a fault of a circuit supplied with a voltage from the power generation part 120 and providing the feedback signal by the IC chip (S920), based on the circuit malfunctioning, the feedback signal may be provided to the power generation part 120 by the IC chip.

Here, the IC chip may comprise a comparator comparing a voltage outputted from the power generation part 120 and the first threshold voltage, and a transistor outputting the feedback signal to the power generation part 120 based on an output value of the comparator.

According to the various embodiments of the disclosure as described above, in a display device, an IC chip identifies an overvoltage outputted from a power generation part and provides a feedback signal, and accordingly, the same operation can be performed without a conventional overvoltage protection circuit.

Also, if a PS Off signal is input, the display device reduces a voltage of a direct current power provided by the power generation part of the display device, and can thereby reduce standby power consumption consumed by the IC chip. Also, when the voltage of the direct current power is reduced, the IC chip changes components connected to the IC chip to an idle state, and can thereby also reduce standby power consumption consumed by the components connected to the IC chip.

Further, as the IC chip may detect a direct current power, there is a benefit that an overvoltage protecting operation is not stopped. In addition or alternatively, as a circuit inverting a signal is omitted among protection circuits according to a fault at the power generation part, the cost for implementation can be reduced, and the display device can be implemented in a smaller size.

Also, as the existing terminal of the IC chip can be used as it is, the manufacturing cost of the IC chip does not increase even through the functions of the IC chip are added.

In the above disclosure, the overall descriptions assumed a display device, but the disclosure is not limited thereto. For example, even in the case of a general electronic device, if it is a device wherein a circuit inside the electronic device needs to be protected from an overvoltage, the circuit can be protected from an overvoltage by the method as in the disclosure.

Also, while it was described that the IC chip comprises a comparator, etc., the internal structure of the IC chip can be implemented in numerous various ways. That is, the IC chip can be of any structure if it is a structure that can identify whether a power from the power generation part is an overvoltage, and can provide a feedback signal to the power generation part in case an overvoltage occurred.

According to an embodiment of the disclosure, the aforementioned various embodiments may be implemented as software including instructions stored in machine-readable storage media, which can be read by machines (e.g., computers). The machines refer to devices that call instructions stored in a storage medium, and can operate according to the called instructions, and the devices may comprise an electronic device according to the aforementioned embodiments (e.g., an electronic device A). In case an instruction is executed by a processor, the processor may perform a function corresponding to the instruction by itself, or by using other components under its control. An instruction may comprise a code that is generated or executed by a compiler or an interpreter. A storage medium that is readable by machines may be provided in the form of a non-transitory storage medium. Here, the term 'non-transitory' only means that a storage medium does not comprise signals, and is tangible, but does not indicate whether data is stored in the storage medium semi-permanently or temporarily.

Also, according to an embodiment of the disclosure, a method according to the aforementioned various embodiments may be provided while being comprised in a computer program product. The computer program product can be traded between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be at least temporarily stored in a storage medium such as a server of a manufacturer, a server of an application store, or a memory of a relay server, or temporarily generated.

In addition, according to an embodiment of the disclosure, the various embodiments described above may be implemented in a recording medium that can be read by a computer or a device similar to a computer, by using software, hardware, or a combination thereof. In some cases, the embodiments described in this specification may be implemented as a processor itself. According to implementation by software, the embodiments such as procedures and functions described in this specification may be implemented as separate software modules. Each of the software modules can perform one or more functions and operations described in this specification.

Computer instructions for performing processing operations according to the aforementioned various embodiments of the disclosure may be stored in a non-transitory computer-readable medium. Computer instructions stored in such a non-transitory computer-readable medium may make the processing operations according to the aforementioned various embodiments performed by a specific machine, when the instructions are executed by the processor of the specific machine. A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM and the like.

Also, each of the components (e.g., a module or a program) according to the aforementioned various embodiments may be comprised of a single entity or a plurality of entities, and some sub-components among the aforementioned sub-components may be omitted, or different sub-components may be further included in the various embodiments. Alternatively or additionally, some components (e.g., modules or programs) may be integrated into one entity to perform the same or similar functions performed by each component prior to integration. Operations performed by a module, a program, or another component, in accordance with the various embodiments, may be performed sequentially, in parallel, repetitively, or in a heuristic manner, or at least some operations may be performed in a different order, omitted, or a different operation may be added.

Further, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A display device comprising:
   a power generation part comprising a converter and configured to supply power to a display panel and a main circuit in the display device; and
   an integrated circuit (IC) chip configured to receive a first voltage from the power generation part and provide a feedback signal to the power generation part, the feedback signal identifying the first voltage being equal to or higher than a first threshold voltage,
   wherein the power generation part is further configured to stop a switching operation of the converter based on the feedback signal,
   wherein the power generation part is further configured to stop supplying power to the display panel and the main circuit when the power generation part stops the switching operation of the converter,
   wherein the IC chip is further configured to detect a voltage of a predetermined node of the main circuit, and based on an abnormality being occurred in the voltage of the predetermined node, provide the feedback signal to the power generation part,
   wherein the IC chip is configured to receive a pulse width modulation (PWM) dimming signal, and
   wherein, based on a period that a low value of the PWM dimming signal is maintained exceeding a threshold time, the IC chip is configured to provide the feedback signal to the power generation part, and is configured to transmit, to a circuit connected to the power generation part, a first control signal for changing a state of the circuit connected to the power generation part to an idle state.

2. The display device of claim 1, further comprising:
   a standby circuit that is connected to an output end of the power generation part, and, based on a standby mode instruction being received by the standby circuit, that reduces a voltage value of a voltage outputted from the power generation part.

3. The display device of claim 2, wherein:
   based on the voltage value of the voltage becoming lower than a second threshold voltage, the IC chip is configured to transmit to the circuit connected to the power generation part, the first control signal for changing the state of the circuit connected to the power generation part to the idle state, and
   the second threshold voltage is lower than the first threshold voltage.

4. The display device of claim 3, wherein the IC chip is configured to transmit, based on the voltage value of the voltage outputted from the power generation part becoming higher than a third threshold voltage that is higher than the second threshold voltage while the circuit connected to the power generation part is in the idle state, a second control signal for waking up the circuit connected to the power generation part to the circuit connected to the power generation part, and
   wherein the third threshold voltage is lower than the first threshold voltage.

5. The display device of claim 3, wherein the IC chip is configured to transmit, based on an idle enable signal being received while the circuit connected to the power generation part is in the idle state, a second control signal for waking up the circuit connected to the power generation part to the circuit connected to the power generation part.

6. The display device of claim 1, wherein the IC chip is configured to transmit, based on receiving the PWM dimming signal after providing the feedback signal, a second control signal for waking up the circuit connected to the power generation part to the circuit connected to the power generation part.

7. The display device of claim 1, wherein the IC chip comprises:
   a comparator configured to compare a voltage outputted from the power generation part and the first threshold voltage; and
   a transistor configured to output the feedback signal to the power generation part based on an output value of the comparator.

8. A method of a display device, the method comprising:
   receiving, by an integrated circuit (IC) chip, a first voltage outputted from a power generation part including a converter and supplying power to a display panel and a main circuit in the display device; and providing a feedback signal to the power generation part by the IC chip, the feedback signal identifying the first voltage being equal to or higher than a first threshold voltage;

stopping a switching operation of the converter based on the feedback signal;

stopping supplying power to the display panel and the main circuit when the switching operation of the converter being stopped;

detecting a voltage of a predetermined node of the main circuit; and based on an abnormality being occurred in the voltage of the predetermined node, providing the feedback signal to the power generation part, wherein the providing the feedback signal comprises:
receiving a pulse width modulation (PWM) dimming signal by the IC chip; and
based on a period that a low value of the PWM dimming signal is maintained exceeding a threshold time, providing the feedback signal to the power generation part by the IC chip, and transmitting to a circuit connected to the power generation part, a first control signal for changing a state of the circuit connected to the power generation part to an idle state.

9. The method of claim 8, further comprising, based on a standby mode instruction, reducing a voltage value of a voltage outputted from the power generation part.

10. The method of claim 9, further comprising:
based on the voltage value of the voltage outputted from the power generation part becoming lower than a second threshold voltage, transmitting to the circuit connected to the power generation part, the first control signal for changing the state of the circuit connected to the power generation part to the idle state,
wherein the second threshold voltage is lower than the first threshold voltage.

11. The method of claim 10, further comprising:
based on the voltage value of the voltage outputted from the power generation part becoming higher than a third threshold voltage higher than the second threshold voltage while the circuit connected to the power generation part is in the idle state, transmitting a second control signal for waking up the circuit connected to the power generation part to the circuit connected to the power generation part by the IC chip,
wherein the third threshold voltage is lower than the first threshold voltage.

12. The method of claim 10, further comprising:
based on an idle enable signal being received while the circuit connected to the power generation part is in the idle state, transmitting a second control signal for waking up the circuit connected to the power generation part to the circuit connected to the power generation part by the IC chip.

13. The method of claim 8, further comprising:
transmitting by the IC chip, based on receiving the PWM dimming signal after providing the feedback signal, a second control signal for waking up the circuit connected to the power generation part to the circuit connected to the power generation part.

14. The method of claim 8, further comprising:
comparing, by a comparator of the IC chip, a voltage outputted from the power generation part and the first threshold voltage; and
outputting, by a transistor of the IC chip, the feedback signal to the power generation part based on an output value of the comparator.

* * * * *